United States Patent [19]
Manes et al.

[11] Patent Number: 5,774,301
[45] Date of Patent: Jun. 30, 1998

[54] APPARATUS FOR LATCHING AND EJECTING CARTRIDGES FROM A CARTRIDGE TAPE DRIVE IN A STORAGE LIBRARY SYSTEM AND DETECTION SYSTEM THEREFOR

[76] Inventors: Joseph P. Manes, 7571 Ames St., Arvada, Colo. 80003; Donald B. Wait, 740 34th St., Boulder, Colo. 80303; Joseph P. Falace, 131 S. Madison Ave., Louisville, Colo. 80027; Randal Fird, 1340 Ithaca Dr., Boulder, Colo. 80303; David Black, 13122 Bellaire Dr., Thornton, Colo. 80241; Daniel Plutt, 1049 E. Iliff Way, Superior, Colo. 80027; Robert S. Creager, P.O. Box 1319, Berthood, Colo. 80513; Adam Mehlberg, 632 Pratt, St., Longmont, Colo. 80501; Scott Wilson, 2196 W. 116th Ave., Westminster, Colo. 80234

[21] Appl. No.: 746,729
[22] Filed: Nov. 15, 1996
[51] Int. Cl.⁶ .................................................. G11B 15/38
[52] U.S. Cl. ................................................................ 360/92
[58] Field of Search .............................. 360/92; 414/932, 414/751

[56] References Cited

U.S. PATENT DOCUMENTS

| | | |
|---|---|---|
| 5,226,779 | 7/1993 | Yeakley . |
| 5,236,296 | 8/1993 | Ostwald . |
| 5,242,259 | 9/1993 | Yeakley . |
| 5,277,540 | 1/1994 | Helms et al. . |
| 5,303,034 | 4/1994 | Carmichael et al. . |
| 5,321,353 | 6/1994 | Furness . |
| 5,323,327 | 6/1994 | Carmichael et al. . |
| 5,331,232 | 7/1994 | Moy et al. . |
| 5,418,664 | 5/1995 | Ostwald . |
| 5,421,697 | 6/1995 | Ostwald . |
| 5,456,569 | 10/1995 | Cheatham et al. . |
| 5,479,581 | 12/1995 | Kleinschnitz . |
| 5,644,559 | 7/1997 | Christie Jr. et al. .................... 360/92 |

OTHER PUBLICATIONS

"Mechanical Design of an Optical Disk Autochanger", Hewlett–Packard Journal, Dec. 1990.

*Primary Examiner*—Robert S. Tupper
*Attorney, Agent, or Firm*—Brooks & Kushman, P.C.

[57] ABSTRACT

An apparatus for latching and ejecting cartridges from a cartridge tape drive in a storage library system includes a robotically actuated hand assembly. The apparatus comprises a pin extending from the hand assembly and a rotatable lever extending from the cartridge tape drive. The rotatable lever is pivotable between a first position in which the cartridge is locked in the tape drive and a second position in which the cartridge is ejected from the tape drive. The pin is operative to engage the rotatable lever for pivoting the lever between the first and second positions when the hand assembly is robotically actuated. A visible pattern is applied to the rotatable rod and offset from the axis of rotation of the rod such that the pattern appears to move into and out of alignment with the camera target as viewed by a line-scan camera when the rod rotates between the first and second positions. Accordingly, the status of the tape drive may be easily attained.

5 Claims, 10 Drawing Sheets

APPARATUS FOR LATCHING AND EJECTING CARTRIDGES FROM A CARTRIDGE TAPE DRIVE IN A STORAGE LIBRARY SYSTEM AND DETECTION SYSTEM THEREFOR

TECHNICAL FIELD

The present invention relates to an apparatus for latching and ejecting cartridges from a cartridge tape drive in a storage library system including a robotically actuated hand assembly and a detection device for determining tape drive status.

BACKGROUND OF THE INVENTION

Robotic tape library systems provide reliable, low cost data storage and retrieval services. A plurality of data cartridges, e.g. cartridges containing spooled reels of magnetic tape, reside in their respective storage compartments for use as needed. Typically, a robotic arm is used to grasp a particular cartridge for transport to a cartridge drive mechanism or drive bay that is compatible with the cartridge. The drive mechanism conducts read, write, and erase operations on the cartridge. Examples of commercially available cartridge library systems include the 4400 and Wolfcreek library systems available from Storage Technology Corporation of Longmont, Colo.

The robotic arms of these systems move with speed and precision, but finite limits exist as to the tasks that the arms can perform. A robotic arm sometimes cannot be made to access a particular cartridge drive mechanism because such access requires the robotic arm to perform simultaneous tasks, or because structure on the drive mechanism interferes with travel of the arm. Thus, drive mechanisms that are designed to accommodate a manually inserted cartridge often cannot be adapted for use in robotic library systems.

FIG. 1 depicts a prior art manual tape drive 20 that is commercially available as one of the 2000, 4000, or 7000 series drives from Quantum Corporation of Shrewsburg, Mass. Drive 20 includes a drive bay 22 having an interior tape receiving compartment 24. Door 26 is depicted in an open position that permits frontal access to compartment 24. Door 26 is attached to pivot rod 28 for pivoting movement of door 26 along arrow 30 between the open position as depicted and a closed position where the face 32 of door 26 abuts the forward surface 34 of drive bay 22. As depicted in FIG. 1, the pivot rod 28 has a notch 36 from which a manual lever (not shown) has been removed.

In the commercially available device, a user operates the manual lever to rotate pivot rod 28 for the concomitant pivoting of door 26 between their respective open and closed positions. The pivoting of door 26 by rod 28 serves to move internal drive components within drive bay 22 into a positional alignment for interaction with a tape cartridge that can be placed into the compartment 24. Drive 20 includes a conventional solenoid lock assembly 38 that can lock door 26 into a fixed position when desired. Thus, a user places the data storage cartridge into compartment 24, operates the manual lever to close door 26 and cause the drive 20 to load the data storage cartridge. Upon completion of the cartridge read/write operation, the user operates the manual lever to open door 26 and cause the drive 20 to eject the data storage cartridge to a position where the user can grasp the data cartridge and remove it from the compartment 24.

FIG. 2 depicts a prior art robotic hand 40 that is commercially available from Storage Technology Corporation of Louisville, Colo., as a component in a robotic data cartridge library system. Robotic hand 40 is normally connected to the end of a conventional robotic arm, such as that illustrated schematically in FIG. 3. As shown in FIG. 3, a typical robotic arm assembly 70 would include a support post 72 with an arm 74 pivotally connected thereto, and a hand assembly 76 disposed at the end of the arm 74. The arm 74 is rotatable with respect to the support post 72, as illustrated by the theta ($\theta$) angle. The arm 74 is also movable in the Z direction with respect to the support post 72. The Z movement could be accomplished at the support post, or the hand assembly 76 could be vertically movable with respect to the arm 74.

Returning to FIG. 2, this particular prior art hand assembly 40 includes a robotic eye 42 that scans targets for positional alignment or adjustment of hand 40. A belt-driven pulley wheel is used to extend and retract a cartridge grasping assembly 46 between forward and rearward positions. Assembly 46 includes four outwardly extending fingers 48, 50, 52 and 54. A cartridge backstop 56 is mounted in the recessed area between the fingers. A pair of opposed cartridge grasping paddles 58 and 60 can be pivoted up and down along the direction of arrow 62 for grasping and releasing data cartridges that are positioned between the fingers 48–54.

The prior art hand illustrated in FIG. 2 is not useful for inserting a data cartridge into a tape drive, such as drive 20 (FIG. 1), and then removing the cartridge. One problem is that the fingers 50 and 52 of hand 40 will contact door 26 of drive 20 in a manner that precludes full insertion of the data cartridge into the compartment. Door 26 (FIG. 1) will also prevent or interfere with motion of paddle 58 along arrow 62 (FIG. 2). These interferences may cause mechanical failure of the hand 40 and drive 20. The hand 40 is also incapable of simultaneously inserting a cartridge into compartment 24 and rotating pivot rod 28 to close door 26 and facilitate driving engagement of the cartridge.

Most commercially available cartridge tape drives are provided with such a pivoting rod (as rod 28 of FIG. 1) which actuates internal mechanisms for tape drive engagement and for ejecting the cartridge. It is desirable to provide a simplified apparatus for rotating such a rod which is integral with the hand and tape drive assemblies without requiring complex mechanical or electromechanical devices.

Another problem with such cartridge tape drives is that when a tape drive powers on, such as Quantum drives DLT 4000 or 7000, the drive is unable to report the status of these rotatable rods used for tape engagement and tape ejection. This lack of status requires the operator to open the machine and verify the position of all drive rods and, if necessary, manually initialize them by rotating them into a known position. Accordingly, it is further desirable to provide an inexpensive and accurate device for determining the position of the rod.

DISCLOSURE OF THE INVENTION

The present invention overcomes the problems outlined above by taking advantage of the fact that most tape drives include such a rotatable rod (as rod 28 of FIG. 1) which actuates internal tape drive mechanisms for tape engagement and cartridge ejection. This invention provides a lever on the cartridge tape drive which cooperates with the rotatable rod for rotating the rod between first and second positions (tape engagement and ejection positions) as the lever is moved. The hand assembly is provided with a pin extending therefrom for engagement with the lever such that the hand may engage the lever for rotating the rotatable rod and engaging or disengaging the cartridge.

More specifically, the present invention provides an apparatus for engaging and disengaging cartridges from a drive bay of a cartridge tape drive in a storage library system including a robotically actuated hand assembly, wherein the cartridge tape drive includes a rotatable rod operative to actuate internal drive components within the drive bay to facilitate driving engagement of the cartridge in the drive bay and disengagement of the cartridge from the drive bay when the rod is rotated between first and second positions, respectively. The apparatus comprises a pin extending from the hand assembly and a lever operatively connected to the rotatable rod and extending from the cartridge tape drive. The pin is positioned on the hand assembly to facilitate engagement with the lever for moving the lever to rotate the rotatable rod between the first and second positions when the hand assembly is robotically actuated.

The present invention overcomes the above-referenced shortcoming of prior art assemblies with respect to determining position of the rotatable rod by providing a visible pattern on the rotatable rod which moves into and out of alignment with a camera target as viewed by a line-scan camera when the rod is rotated between tape engagement and disengagement positions.

More specifically, this aspect of the invention provides an apparatus for determining position of a rotatable rod which is rotatable about an axis of rotation in a cartridge tape drive in a storage library system including a robotically actuated hand assembly with a line-scan camera, wherein the cartridge tape drive includes a camera target and the rotatable rod is operative to actuate internal drive components within the cartridge tape drive to facilitate driving engagement of a cartridge in the tape drive and disengagement of the cartridge from the tape drive when the rod is rotated between first and second positions, respectively. The apparatus comprises a visible pattern connected with respect to the rotatable rod and offset from the axis of rotation of the rod such that the pattern appears to move into and out of alignment with the camera target as viewed by the line-scan camera when the rod rotates between the first and second positions.

Accordingly, an object of the present invention is to provide an apparatus for latching and ejecting cartridges from a cartridge tape drive in a storage library system in which a simplified mechanism is provided such that the hand assembly may easily rotate the rotatable rod of the cartridge tape drive for cartridge engagement or disengagement.

A further object of the present invention is to provide an apparatus for determining position of the rotatable rod which does not require expensive sensing equipment or other devices.

The above objects and other objects, features, and advantages of the present invention are readily apparent from the following detailed description of the best mode for carrying out the invention when taken in connection with the accompanying drawings.

DETAILED DESCRIPTION OF THE PREFERRED EMBODIMENTS

Figure 3:
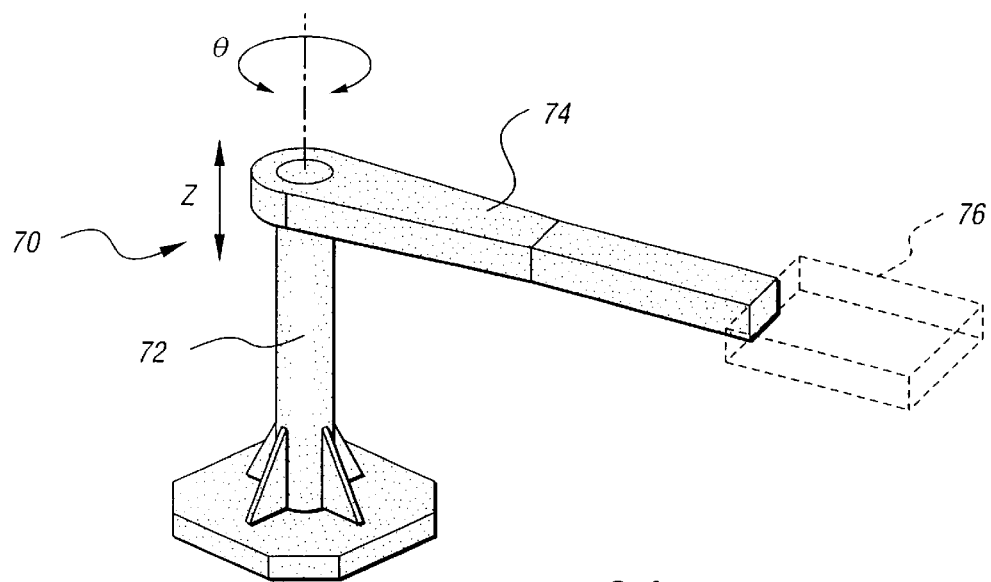
FIG. 3 shows a schematically illustrated perspective view of a typical prior art robotic arm assembly.
Figure 4:
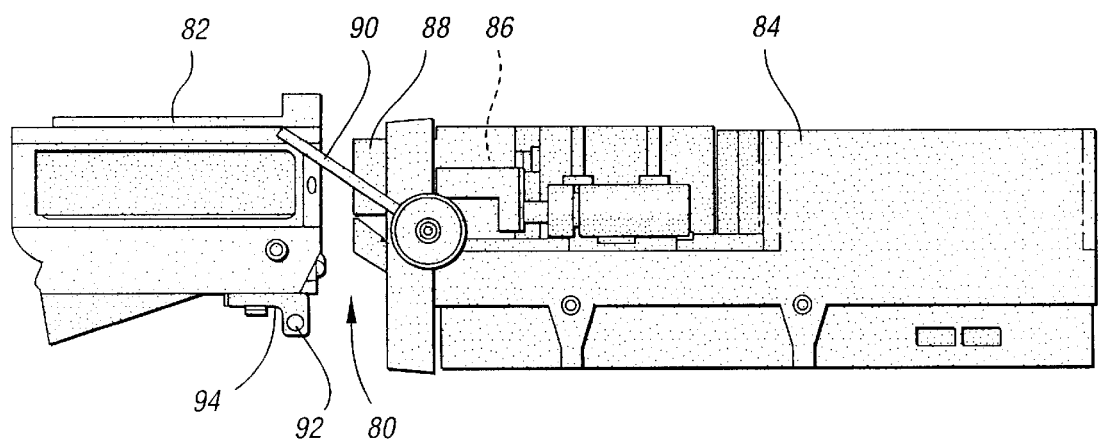
FIG. 4 shows a side view of a hand assembly and cartridge tape drive in accordance with the present invention.

A first aspect of the invention is illustrated in FIGS. 4–10. FIG. 4 illustrates the apparatus 80 for latching and ejecting cartridges from a cartridge tape drive in a storage library system in accordance with the present invention. The apparatus includes a robotically actuated hand assembly 82 which is movable by means of an arm assembly, such as the assembly illustrated in FIG. 3. Accordingly, the hand assembly 82 is movable in the Z direction and rotatable in the theta (θ) direction, as illustrated in FIG. 3.

Returning to FIG. 4, the hand assembly 82 is shown positioned adjacent a cartridge tape drive 84. Preferably, the cartridge tape drive 84 is a DLT tape drive manufactured by Quantum Corporation. The cartridge tape drive 84 includes a rotatable rod (not visible in FIG. 4 — see 112 of FIG. 11) operative to actuate internal drive components within the drive bay 86 to facilitate driving engagement of the cartridge 88 in the drive bay 86 and disengagement of the cartridge 88 from the drive bay 86 when the rod is rotated between first and second positions, respectively.

The rotatable rod is operatively connected to the lever 90 by conventional means, preferably by a bolt extending through the housing for engagement with the rotatable rod. The hand assembly is equipped with a pin 92 secured thereto by a bracket 94 for engaging the lever 90 to pivot the lever between first and second positions for rotating the rotatable rod within the tape drive 84 for engaging or disengaging cartridges.

Figure 5:
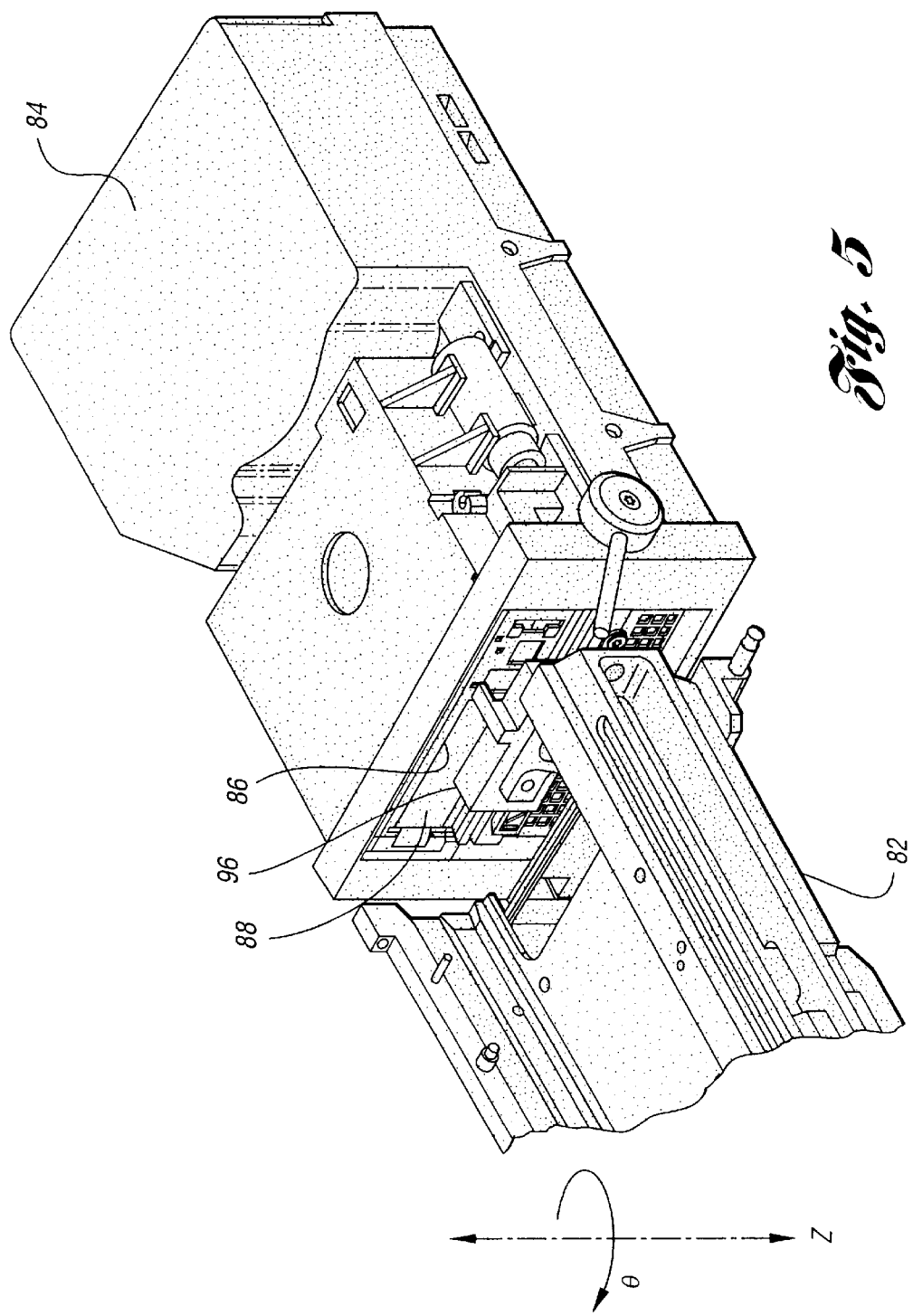
FIG. 5 shows a perspective view of a hand assembly and cartridge tape drive in accordance with the present invention with the cartridge inserted into the tape drive.

Referring to FIG. 5, the step of inserting the cartridge 88 into the tape drive 84 is illustrated. The hand assembly 82 is positioned by its respective arm assembly directly adjacent the drive bay 86 of the cartridge tape drive 84, and the hand carriage 96 of the hand assembly 82 pushes the cartridge 88 into the drive bay 86.

Figure 6:
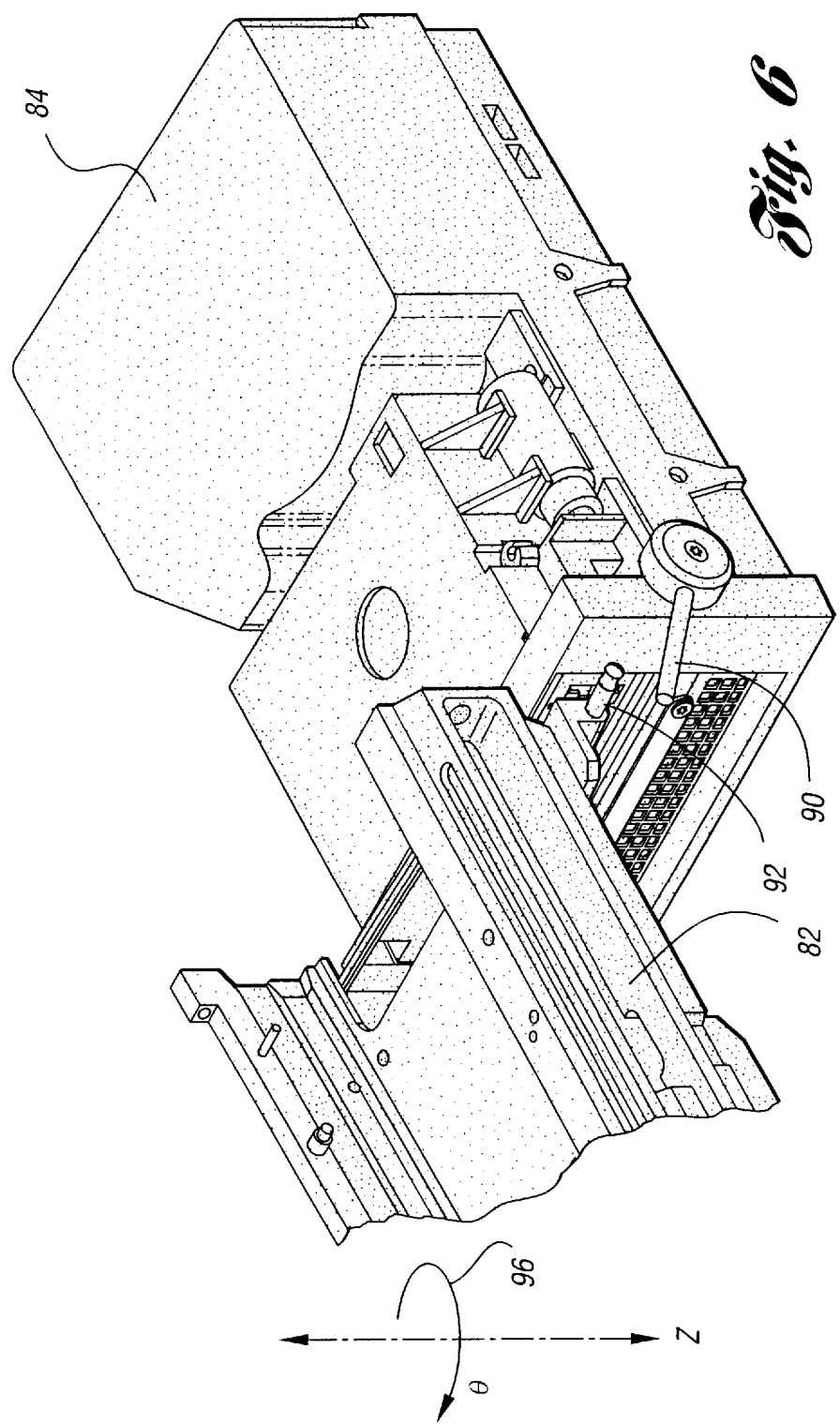
FIG. 6 shows a perspective view of the hand assembly and cartridge tape drive of FIG. 5 with the hand assembly positioned for engagement against the lever.
Figure 7:
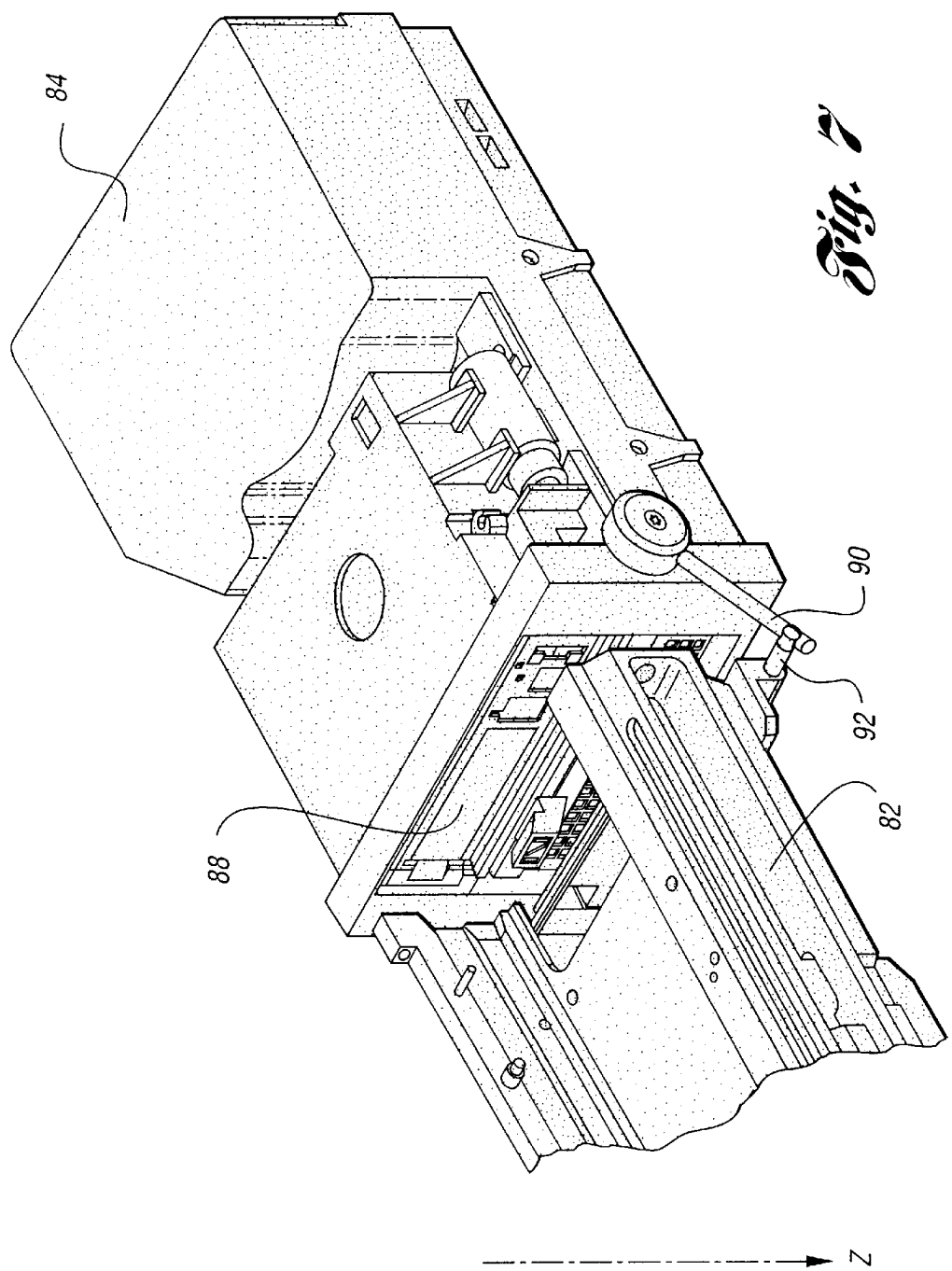
FIG. 7 shows a perspective view of the hand assembly and cartridge tape drive of FIG. 5 with the hand assembly engaging the lever.

Turning to FIGS. 6 and 7, once the cartridge 88 has been inserted into the drive bay 86 of the tape drive 84, the hand assembly 82 moves up along the Z axis and rotates slightly in the theta (θ) direction illustrated by the arrow 96 to position the lift pin 92 above the handle lever 90. As shown in FIG. 7, the hand assembly 82 is then moved downward along the Z axis by the robotic arm assembly, thus causing the lift pin 92 to contact the handle lever 90 and lower the lever 90 on the drive, thereby rotating the rotatable rod within the tape drive 84 to lock the cartridge 88 within the drive 84 to allow tape initialization to occur. Accordingly, the lever 90 is moved from the "second" position illustrated in FIG. 6 to the "first" position illustrated in FIG. 7 for locking the cartridge within the tape drive 84.

Figure 8:
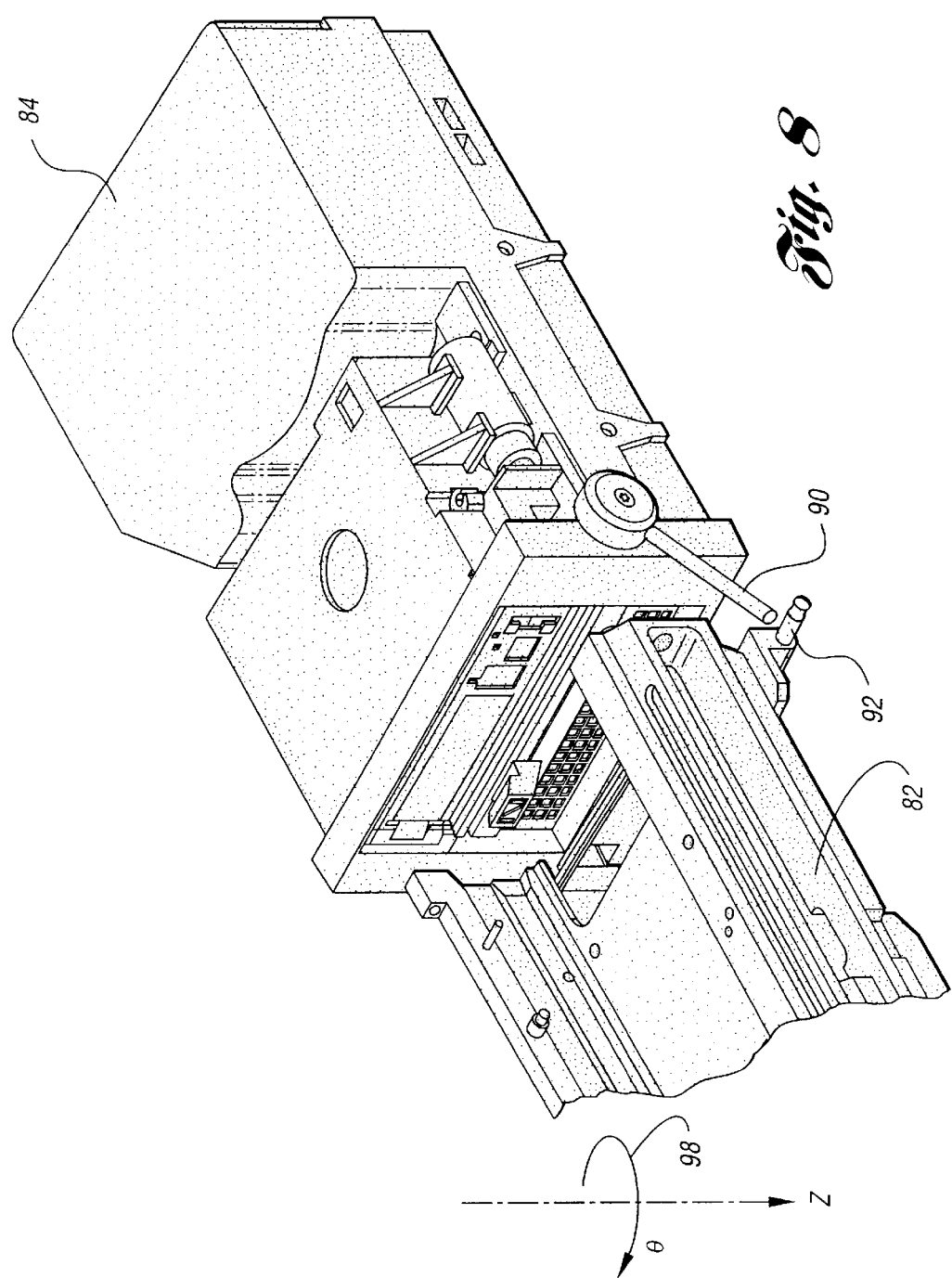
FIG. 8 shows a perspective view of the hand assembly and cartridge tape drive of FIG. 5 with the hand assembly positioned for raising the lever.
Figure 9:
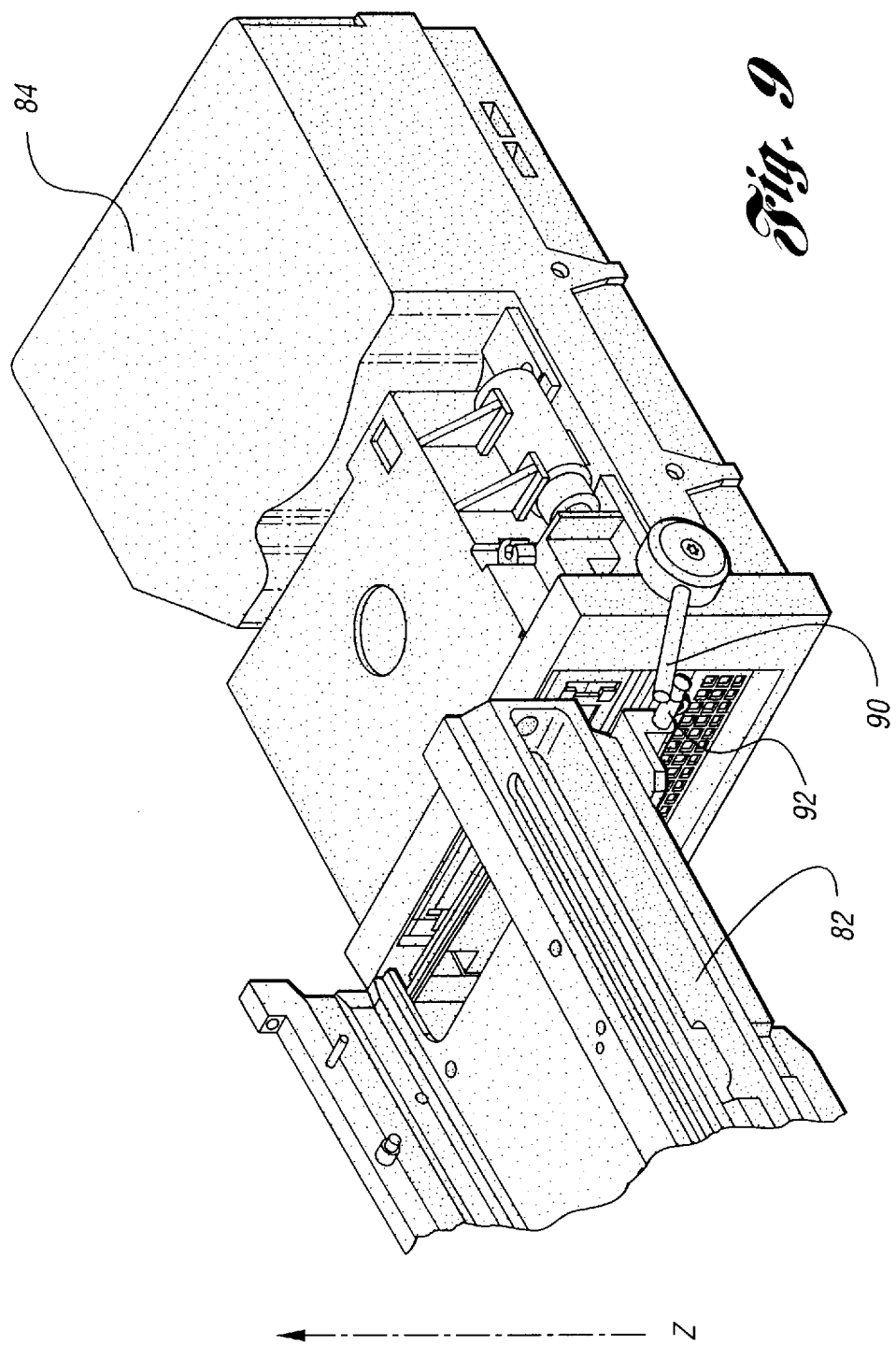
FIG. 9 shows a perspective view of the hand assembly and cartridge tape drive of FIG. 5 with the hand assembly engaging the lever for ejecting a cartridge.

Referring to FIGS. 8–9, the handle lever 90 must then be moved from the first position shown in FIG. 8 to the second position shown in FIG. 9 for ejecting the tape. Accordingly, the hand assembly is moved to position the lift pin under the handle lever 90 by moving down along the Z axis and making a slight theta (θ) rotation in the direction illustrated by arrow 98, as shown in FIG. 8. As shown in FIG. 9, the hand assembly 82 then moves upward along the Z axis such that the lift pin 92 contacts the lever 90 raising the lever 90 from the first position to the second position, and rotating the rotatable rod within the tape drive 84 for ejecting the tape cartridge from the drive 84.

Figure 10:
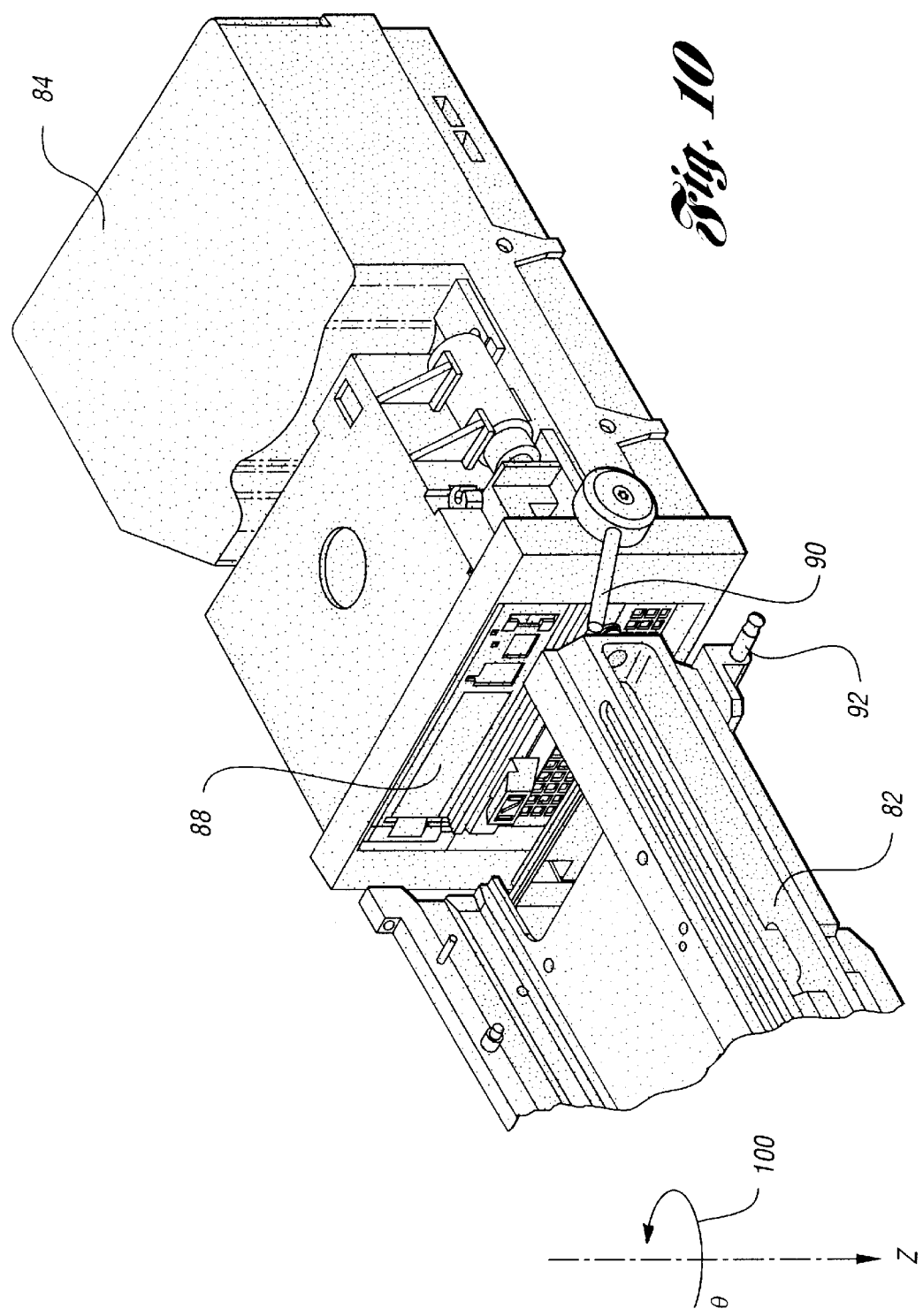
FIG. 10 shows a perspective view of the hand assembly and cartridge tape drive of FIG. 5 with the hand assembly positioned for receiving the ejected cartridge.

Turning to FIG. 10, with the cartridge 88 ejected from the drive 84, the hand assembly 82 then moves back in theta (θ) in the direction illustrated by arrow 100, and the hand assembly moves down along the Z axis to position the hand assembly to retrieve the cartridge 88.

Accordingly, with the addition of the lever 90 in cooperation with the rotatable rod of the tape drive 84 along with the lift pin 92 attached to the hand assembly, a low cost and low complexity assembly is provided for engaging and disengaging cartridges from the tape drive. This provides an inexpensive alternative to a motorized mechanism.

Figure 11:
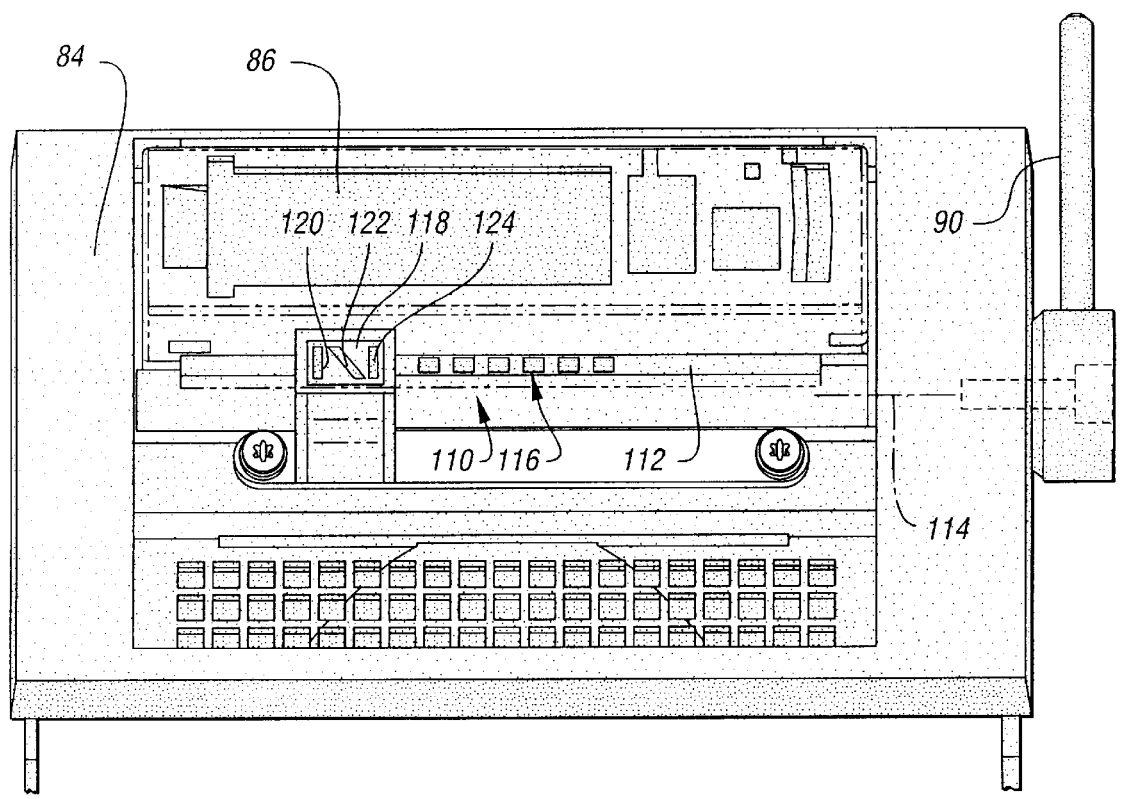
FIG. 11 shows a front elevational view of a cartridge tape drive in accordance with the present invention with the lever in the "up" position and the visible pattern aligned with the target.
Figure 12:
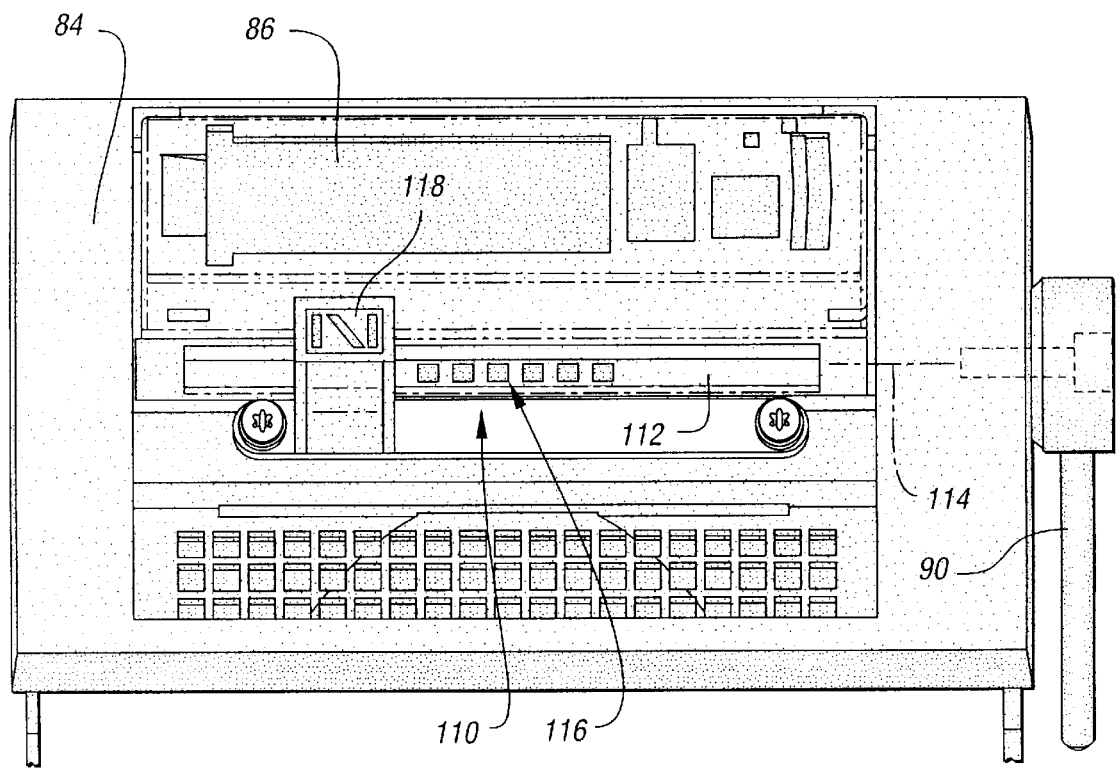
FIG. 12 shows a front elevational view of the cartridge tape drive of FIG. 11 with the lever in the "down" position and the visible pattern aligned offset from the target.

Turning to FIGS. 11 and 12, a second aspect of the present invention is illustrated. An apparatus 110 for determining the position of a rotatable rod 112 is provided for determining whether or not a cartridge has been engaged or disengaged from the drive bay 86 of the cartridge tape drive 84. The rotatable rod 112 rotates about the axis of rotation 114, and is actuated by the lever 90. When the lever 90 is rotated, it rotates the rotatable rod 112 as a result of its linkage therewith.

Figure 1:
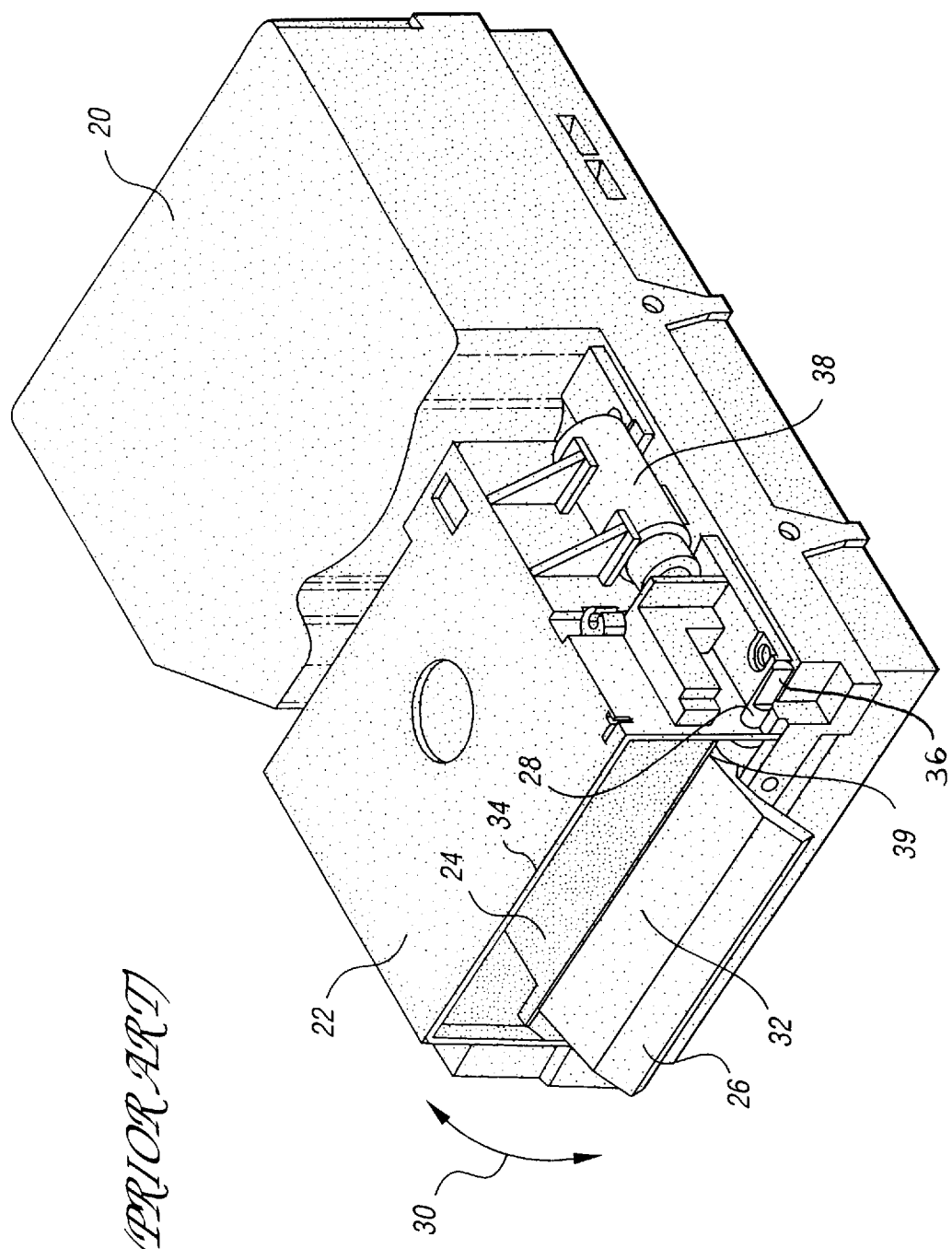
FIG. 1 shows a perspective view of a commercially available data cartridge drive mechanism.
Figure 2:
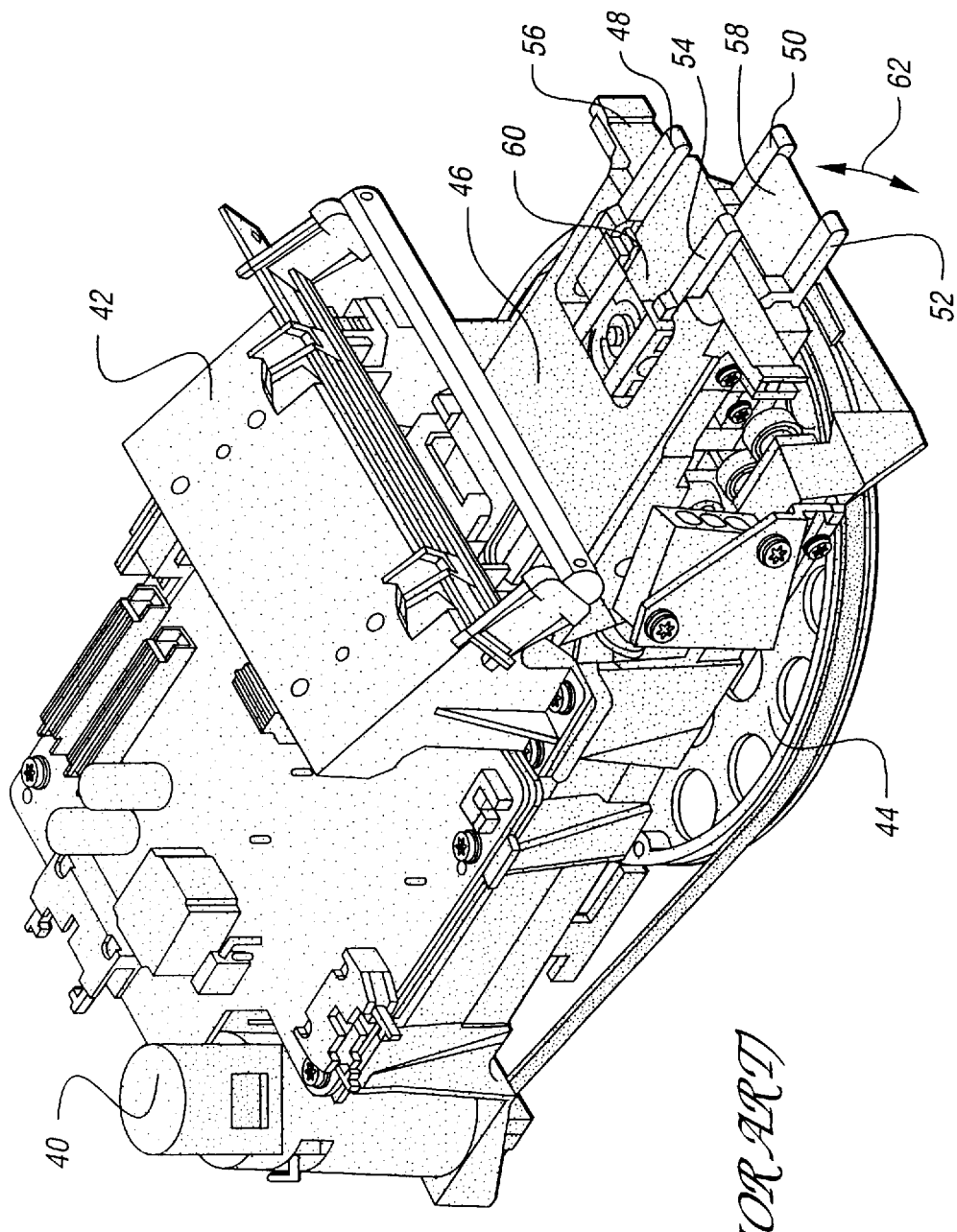
FIG. 2 shows a perspective view of a commercially available robotic hand assembly for use in a data cartridge library system.

In order to determine the position of the lever 90, and therefore the position of the rotatable rod, a visible pattern 116 is applied to the rod 112. Accordingly, the line-scan camera which is secured to the hand assembly, for example as illustrated in FIG. 2, may be used to determine the position of the rod. The line-scan camera is a camera which distinguishes light and dark areas, and may be used for bar code type scanning. The line-scan camera first centers itself on the "N" target 118 by moving up and down until the distance between the features 120, 122 is the same as the distance between features 122 and 124, thereby centering the camera. The camera then searches laterally, and if it sees the visible pattern 116 in alignment with the target 118, then the determination is made that the lever 90 is in the "up" position, in which case the cartridge is not locked into the tape drive 84.

Because the rotatable rod 112 rotates about the axis 114 and is offset therefrom, when the lever 90 is pivoted from the "up" position shown in FIG. 11 to the "down" shown in FIG. 12, the rotatable rod 112 actually moves out of alignment with the target 118, as shown in FIG. 12. Accordingly, in this position, the line-scan camera will not see the visible pattern 116 in alignment with the target 118. Therefore, the determination is made that the lever 90 must be in the "down" position shown in FIG. 12, which means that the cartridge is locked in the tape drive 84.

In this configuration, the only add-on to an existing assembly is to apply the visible pattern 116 directly to the rotatable rod 112. The visible pattern displayed could be any pattern which is recognizable by the line-scan camera. The line-scan camera is standard equipment on such a storage library system, and the other components, such as the lever 90, may be easily added. Therefore, expensive options, such as an infrared proximity sensor are not necessary for determining position of the rotatable rod.

While the best modes for carrying out the invention have been described in detail, those familiar with the art to which this invention relates will recognize various alternative designs and embodiments for practicing the invention within the scope of the appended claims.

What is claimed is:

1. A storage library system comprising:

a cartridge tape drive for receiving a cartridge;

a robotically actuated hand assembly;

a pin extending from the hand assembly; and rotatable lever extending from the cartridge tape drive and pivotable between a first position in which the cartridge is locked in the tape drive, and a second position in which the cartridge is ejected from the tape drive;

wherein the pin is operative to engage said rotatable lever for pivoting the lever between said first and second positions when the hand assembly is robotically actuated.

2. The apparatus of claim 1, further comprising:

a line-scan camera secured to the hand assembly;

a camera target positioned on the cartridge tape drive; and a visible pattern connected to the rotatable rod, wherein the rotatable rod rotates in a position offset from its axis of rotation such that the pattern appears to move into and out of alignment with the camera target as viewed by the line-scan camera when the rod rotates between the first and second positions.

3. A storage library system comprising:

a cartridge tape drive including a drive bay and a rotatable rod operative to actuate internal drive components within the drive bay to facilitate driving engagement of a cartridge in the drive bay and disengagement of the cartridge from the drive bay when the rod is rotated between first and second positions, respectively;

a robotically actuated hand assembly;

a pin extending from the hand assembly; and a lever operatively connected to the rotatable rod and extending from the cartridge tape drive;

wherein the pin is positioned on the hand assembly to facilitate engagement with said lever for moving the lever to rotate the rotatable rod between the first and second positions when the hand assembly is robotically actuated for engaging and disengaging cartridges from the drive bay.

4. The apparatus of claim 3, further comprising:

a line-scan camera secured to the hand assembly;

a camera target positioned on the cartridge tape drive; and a visible pattern connected to the rotatable rod, wherein the rotatable rod rotates in a position offset from its axis of rotation such that the pattern appears to move into and out of alignment with the camera target as viewed by the line-scan camera when the rod rotates between the first and second positions.

5. A storage library system comprising:

a cartridge tape drive including a rotatable rod which is rotatable about an axis of rotation, said cartridge tape drive further including a camera target, and wherein the rotatable rod is operative to actuate internal drive components within the cartridge tape drive to facilitate driving engagement of a cartridge in the tape drive and disengagement of the cartridge from the tape drive when the rod is rotated between first and second positions, respectively;

a robotically actuated hand assembly with a line-scan camera for determining the position of the rotatable rod; and a visible pattern connected with respect to the rotatable rod and offset from the axis of rotation of the rod such that the pattern appears to move into and out of alignment with the camera target as viewed by the line-scan camera when the rod rotates between the first and second positions.

* * * * *